(No Model.)
J. D. PRESCOTT.
METALLIC TIRE FOR BICYCLES.
No. 543,782.        Patented July 30, 1895.
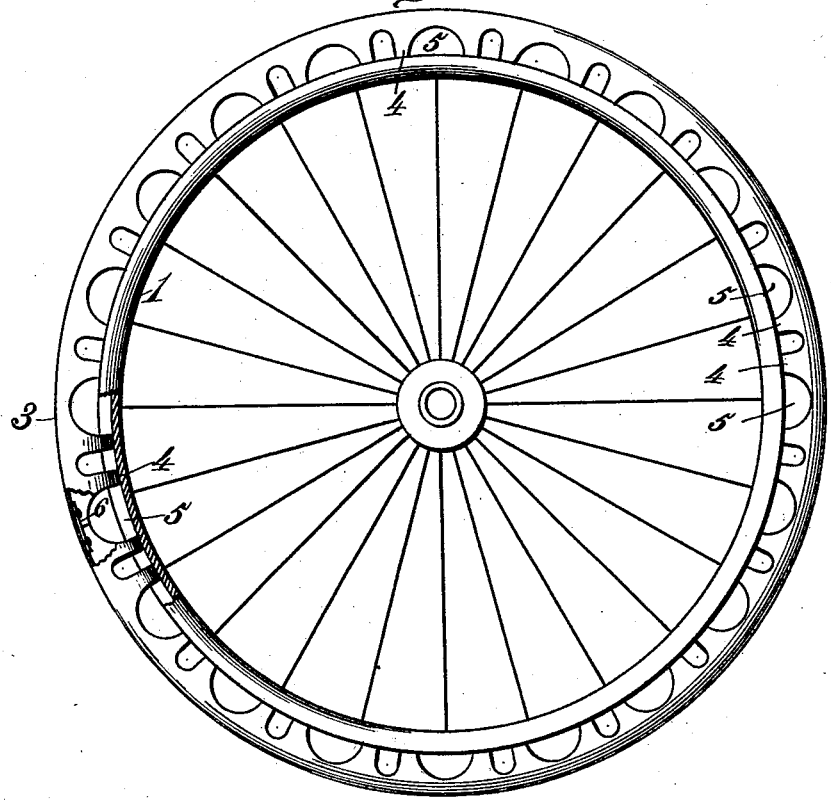
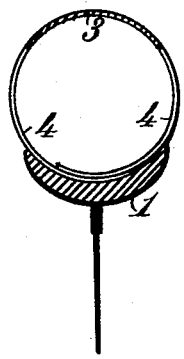
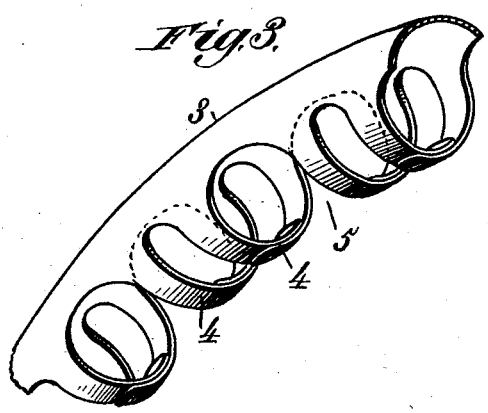
Witnesses.
Robert Everett
Dennis Sumby
Inventor:
Joseph D. Prescott.
By James L. Norris,
Atty.

UNITED STATES PATENT OFFICE.

JOSEPH D. PRESCOTT, OF BOSTON, MASSACHUSETTS.

METALLIC TIRE FOR BICYCLES.

SPECIFICATION forming part of Letters Patent No. 543,782, dated July 30, 1895.

Application filed December 13, 1894. Serial No. 531,668. (No model.)

*To all whom it may concern:*

Be it known that I, JOSEPH D. PRESCOTT, a citizen of the United States, residing at Boston, in the county of Suffolk and State of Massachusetts, have invented new and useful Improvements in Metallic Tires for Bicycle and other Wheels, of which the following is a specification.

It is the purpose of my invention to provide a substitute for the elastic pneumatic tire, or the cushion-tire, now in common use upon bicycles and other vehicles, said substitute consisting of a thin shell of steel, formed in a single piece and having a solid or continuous tread, suitable portions of the metal being removed between the sides of the tread or exposed outer face and the inner face of the tire, and the remaining parts being lapped and having an elastic yield whereby they slide upon each other to provide an elastic yield in the tread of the tire. It is my purpose, also, to provide a substitute for elastic cushion-tires or inflated pneumatic tires, consisting of a plate of thin steel, having similar strips projecting laterally from its opposite edges, said plate and strips being bent into substantially tubular form, with the ends of the strips lapped, and said tubular structure being brought into circular form and its ends united, whereby it can be sprung into the channeled seat for a tire in a wooden or other rim such as is now used in bicycles.

My invention consists, to these ends, in the novel features of construction and in the parts and combination of parts hereinafter fully explained, and then particularly pointed out in the claims which follow this specification.

To enable others to fully understand and to make, construct, and use my said invention, I will describe the same in detail, reference being had for this purpose to the accompanying drawings, in which—

Figure 1 is a side elevation of a wheel, showing my invention applied thereto. Fig. 2 is a transverse section of the rim and metallic tire shown in Fig. 1. Fig. 3 is a detail perspective showing a portion of the metallic tire.

The reference-numeral 1 in said drawings indicates the rim of a wheel of any ordinary bicycle or vehicle type in which a rim is used to support and retain an elastic tire, either of pneumatic or other form. The channeled rim 1 does not materially differ from rims now in common use, and therefore it requires no specific description in this specification.

The numeral 3 indicates an elastic metallic tire in which my present invention is incorporated. This tire consists of a thin plate of steel of sufficient length to enable the completed tire to fully inclose the rim on which it is used. The steel plate is continuous and imperforate for a width sufficient to constitute the tread or outer exposed face of the tire having contact with the roadway. Upon both sides of this continuous portion are formed laterally-projecting strips 4, of suitable width and separated from the adjacent and similar strips by intervals 5, which may be of uniform or of varying width, as circumstances may require. Said strips upon the two edges of the plate stand opposite one another, and their length is such that when the plate and strips are brought into the substantially-tubular form shown in Fig. 3 the ends of the strips on one side will lap upon those on the opposite side to some extent, the length of the lap being subject to such variations as the exigencies of the case may require. The tubular metallic tire thus formed is brought into circular form and to a diameter slightly less than that of the axis of the channel in the rim. The ends of the continuous plate constituting the tread of the tire are then brought together and caused to abut closely one against the other. They are permanently fastened in any preferred manner—as, for example, by a metallic strip or plate 6, laid against the inner faces of the ends of the plate and then riveting through both, as shown in Fig. 1.

The metallic tire is placed upon the rim by compressing the elastic strips 4 and springing the tubular tire over the edge of the rim. When seated in the channel the expansion of the lapped strips will have the same effect that is produced by the contraction of the ordinary rubber tire of any type, the metallic tire being retained by such expansion in the channeled rim with entire security.

As I have already mentioned, the width and length of lap of the strips 4 may be varied to any degree necessary, and the intervals or spaces 5 separating said strips are also subject to modification in similar manner. These intervals may be of any pattern and may also be uniform throughout, or every other space may be wider or narrower, and this same variation as to uniformity may be applied to every third, fourth, fifth, or other interval. I may also modify the width of the continuous plate which forms the tread of the tire.

The whole tire is formed in a single piece, the steel being so thin as to afford a light structure, and is properly tempered to have great strength, toughness, and elasticity. If desired, the tread may be provided with a shoe or covering of any suitable material; but ordinarily the exposed steel face will answer every purpose.

What I claim is—

1. A metallic tire for bicycles and other wheels, as a substitute for pneumatic and other elastic tires, consisting of a steel plate having laterally projecting, separate strips, the whole being bent into tubular form with the ends of the strips lapped, and then brought into circular form and the ends of the steel plate united, substantially as described.

2. A tubular elastic metallic tire for the purpose described, the same consisting of a continuous steel plate, constituting the tread, and curved strips projecting from the edges of the plate and having their free ends lapped, substantially as described.

3. The combination with a rim for a bicycle, or other wheel, of a tubular, elastic, metallic tire, consisting of a continuous steel plate constituting the tread of the wheel and curved strips projecting from the edges of said steel plate, and having their free ends, lapped, the extremities of the steel plate being brought together and fastened, substantially as described.

4. The combination with a rim for a bicycle or other wheel, of a tubular, metallic, elastic tire having a tread consisting of a continuous steel plate, having strips of the same integral metal projecting from its opposite edges at suitable intervals and bent to complete the tubular form, their free ends being lapped and the extremities of the steel plate brought together and fastened, substantially as described.

In testimony whereof I have hereunto set my hand and affixed my seal in presence of two subscribing witnesses.

JOSEPH D. PRESCOTT. [L. S.]

Witnesses:
THOS. A. GREEN,
JAMES L. NORRIS.